United States Patent [19]

Berg et al.

[11] Patent Number: 5,078,960
[45] Date of Patent: Jan. 7, 1992

[54] DEVICE FOR RELIEVING THE PRESSURE IN THE CONTAINMENT OF A NUCLEAR POWER STATION

[75] Inventors: Diethart Berg, Herten-Westerholt; Claus-Gert Reddehase, Kreken-Nieukerk; Manfred Wolf, Essen, all of Fed. Rep. of Germany

[73] Assignee: RWE Energie Aktiengesellschaft, Essen, Fed. Rep. of Germany

[21] Appl. No.: 427,853

[22] PCT Filed: Mar. 2, 1989

[86] PCT No.: PCT/DE89/00124

§ 371 Date: Oct. 5, 1989

§ 102(e) Date: Oct. 5, 1989

[87] PCT Pub. No.: WO89/08315

PCT Pub. Date: Sep. 8, 1989

[30] Foreign Application Priority Data

Mar. 3, 1988 [DE] Fed. Rep. of Germany ....... 3806872

[51] Int. Cl.$^5$ ................................................ G21C 9/00
[52] U.S. Cl. .......................... 376/314; 976/DIG. 378
[58] Field of Search ............................ 376/283, 314; 976/DIG. 378

[56] References Cited

U.S. PATENT DOCUMENTS

| 4,057,464 | 11/1977 | Mair et al. ............................ 376/314 |
| 4,088,737 | 5/1978 | Thomas et al. ...................... 376/314 |
| 4,151,689 | 5/1979 | Schabert ............................. 376/283 |
| 4,610,840 | 9/1986 | Leach ................................... 376/283 |
| 4,913,850 | 4/1990 | Puppe et al. ........................ 376/314 |

FOREIGN PATENT DOCUMENTS

| 290028 | 11/1988 | European Pat. Off. . |
| 2360158 | 2/1978 | France . |
| 2169126 | 7/1986 | United Kingdom . |

OTHER PUBLICATIONS

Nuclear Technology, vol. 72, Mar. 1986, Braun et al., pp. 268–290.

*Primary Examiner*—Daniel D. Wasil
*Attorney, Agent, or Firm*—Herbert Dubno; Andrew M. Wilford

[57] ABSTRACT

A device for relieving the pressure in a containment of a nuclear power station. The device includes a filter unit for filtering compressed air from the containment and discharging the air to the atmosphere. Radioactive substances entrained in the compressed air are removed. The filter unit includes an aerosol-filter subunit located within the containment, and a molecular-sieve subunit for iodine filtering located outside the containment in an auxiliary equipment building. Ducts and fittings connect the subunits of the filter unit. At least one duct extends through the containment wall and can be opened and closed by fittings which can be actuated in the event of a failure.

1 Claim, 3 Drawing Sheets

DEVICE FOR RELIEVING THE PRESSURE IN THE CONTAINMENT OF A NUCLEAR POWER STATION

BACKGROUND OF THE INVENTION

The invention relates generically to a device for relieving pressure during a failure in the containment of a nuclear power station comprising a pressurized water reactor or boiling water reactor, the stream of compressed air from the containment being filtered and discharged to the atmosphere, the device comprising a filter unit for filtering off radioactively contaminated substances entrained in the stream of compressed air, and duct systems and fittings connecting the filter elements of the filter unit. As is known, the containment of a nuclear power station is a building designed to safety regulations and surrounding the reactor vessel and consequently the reactor core. In the invention, the term "filter unit" denotes the functional combination of a number of filter elements, even if serving widely different purposes. In the invention, a "duct system" can comprise a single duct or number of ducts connected by fittings.

The generic device is known from the recommendations of the Reactor Safety Commission. It is included among the measures for protection against failures inside the station and serves to reduce the remaining risk, more particularly during a meltdown. In the known device, the filter unit and all the elements thereof are disposed outside the containment. This necessitates special, expensive buildings for the filter unit, particularly since the filter elements absorb radioactive substances during use and accordingly have to be screened. There are also functional problems. Unless further modifications are made to the building in which the filter unit is located, the filter elements will be in an environment at a temperature considerably lower than the temperature in the containment. A disturbing amount of radioactively contaminated condensate therefore collects in the filter elements. The condensate lowers the efficiency of the filter elements.

It is the object of the invention to improve the generic device so that the buildings can be considerably less expensive and so that the amount of condensate collecting in the filter elements can be reduced, so as not to impair the efficiency of the filter elements through a disturbing accumulation of condensate.

SUMMARY OF THE INVENTION

Therefore according to the invention, at least one subunit of the filter unit is located inside the containment, and at least one duct system for discharging the stream of filtered compressed air is connected to the subunit and extends through the wall of the containment and can be closed by fittings which can be actuated in the event of failure. In the embodiment wherein the filter unit is equipped with aerosol filter elements only, the entire filter unit is located in the containment. The invention also has considerable advantage if the filter unit is formed of subunits serving various functions and comprises an aerosol filter subunit and a molecular-sieve subunit for iodine filtration. In this case, the aerosol filter subunit is disposed inside the containment and the molecular-sieve unit is connected outside the containment via a duct system comprising a reducing valve and actuatable fittings to the duct system for discharging the stream of compressed air.

Optionally, the molecular-sieve subunit is located in an existing building for auxiliary equipment. In the embodiment in which the filter unit comprises an aerosol filter subunit and a molecular-sieve subunit for iodine filtration, preferably both of these subunit are disposed inside the containment and the molecular-sieve subunit is connected via a duct system, a reducing valve and actuatable fittings to the duct system for discharging the stream of compressed air.

Advantages of the invention are that the building construction is simplified and operation is greatly improved. A simplified building construction arises because the containment, which is present in any case, serves the additional purpose, of holding the filter units, which does not require alterations to the building but insures an improved operation. In comparison with the initially described known device, the invention has advantages with regard to aerosol filtering. Radioactive aerosols retained in the aerosol filter elements remain in the containment. Consequently, any condensate collecting outside the containment has fewer radioactive fission products. It is not necessary to screen the filter elements or filter unit in the containment, since the containment also serves as a screen. Due to the higher operating temperature in the containment, less condensate accumulates in the filter elements than in the known embodiment. Thus, the efficiency of the aerosol filter elements is not reduced by condensate formation, even during intermittent operation. The overall bulk is reduced due to the higher density in the containment and the consequently lower specific volume of the filter medium. There are also advantages with regard to the molecular-sieve subunit for iodine filtration. The system as described does not need any external media. There is no extra expense on control systems. The molecular subunit disposed and connected according to the invention is a passive system and therefore less subject to faults. Of course, all components will be kept approximately at the same pressure as the site environment, so that there are no special requirements regarding construction strength.

BRIEF DESCRIPTION OF THE DRAWING

The invention will now be explained with reference to the drawing figures each illustrating an embodiment in diagrammatic form wherein.

DETAILED DESCRIPTION

Figure 1:
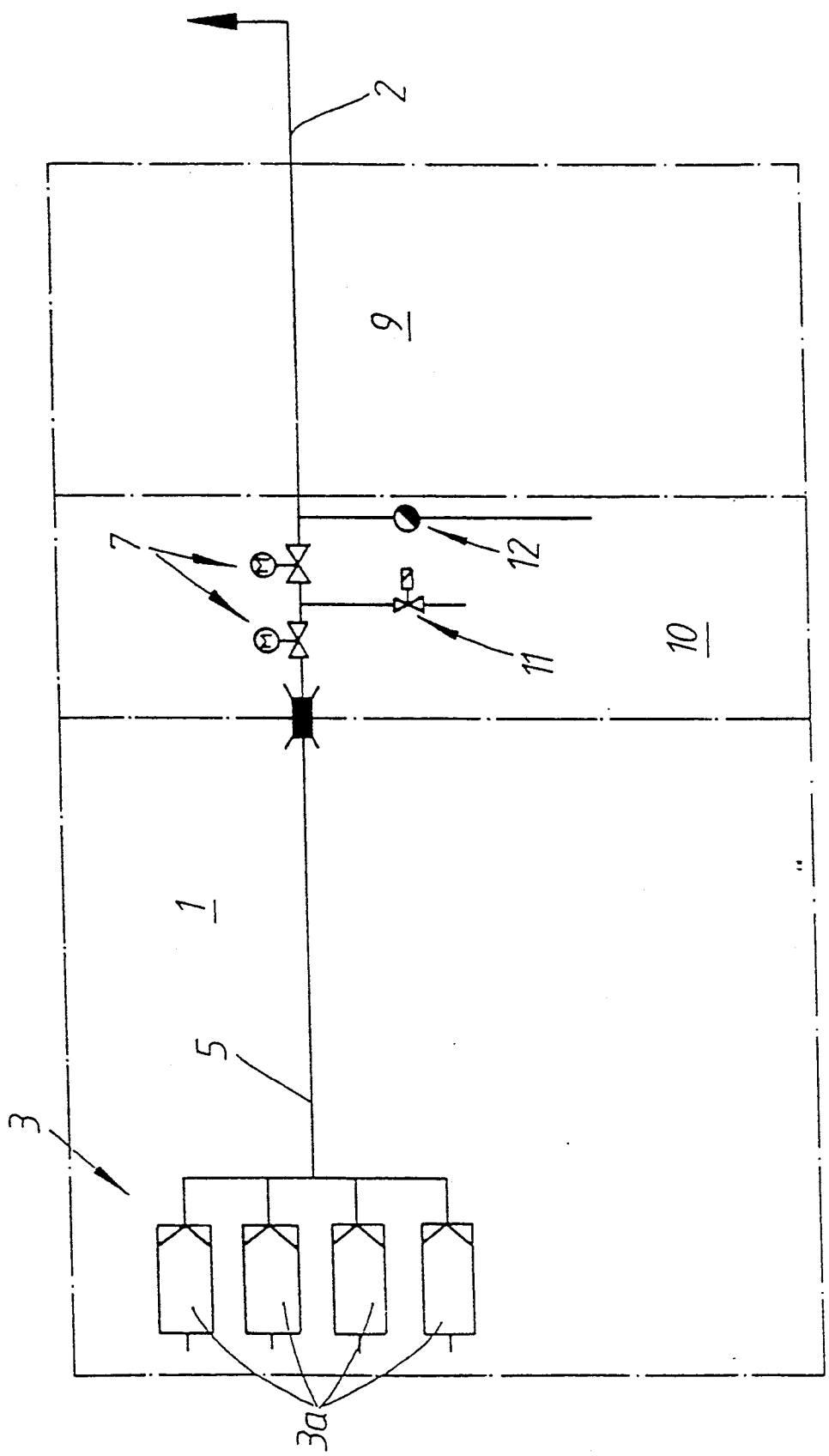
FIG. 1 shows the device in the embodiment wherein the filter unit is equipped only with aerosol filter elements.

The device shown in the drawing is for relieving the pressure in the event of a defect in the containment 1 of a nuclear power station comprising a pressurized water reactor or boiling-water reactor. During pressure relief, the stream of compressed air from containment 1 is filtered and discharged to the atmosphere at 2 in the embodiments. The device includes at least one filter unit 3, 4, for filtering off radioactive substances entrained in the stream of compressed air and a duct system 5, 6 and fittings 7 connecting the filter elements 3a, 4a of the filter unit or filter units 3 and 4.

In the embodiment of FIG. 1, the filter unit 3 comprises aerosol filter elements 3a only. As can be seen, the entire filter unit 3 is located in the containment 1.

Figure 2:
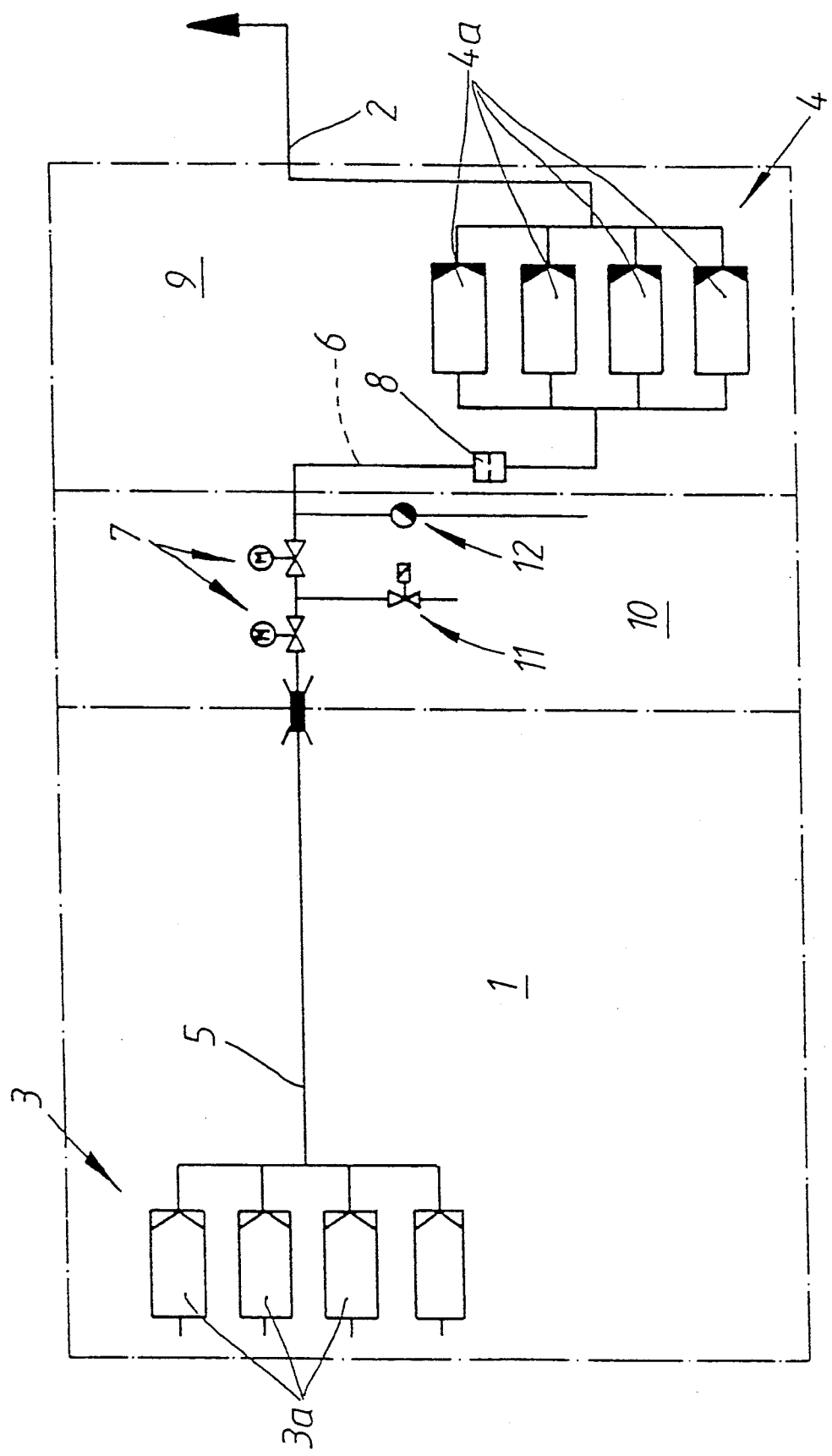
FIG. 2 shows the device of FIG. 1, comprising both an aerosol filter subunit and a molecular-sieve subunit.
Figure 3:
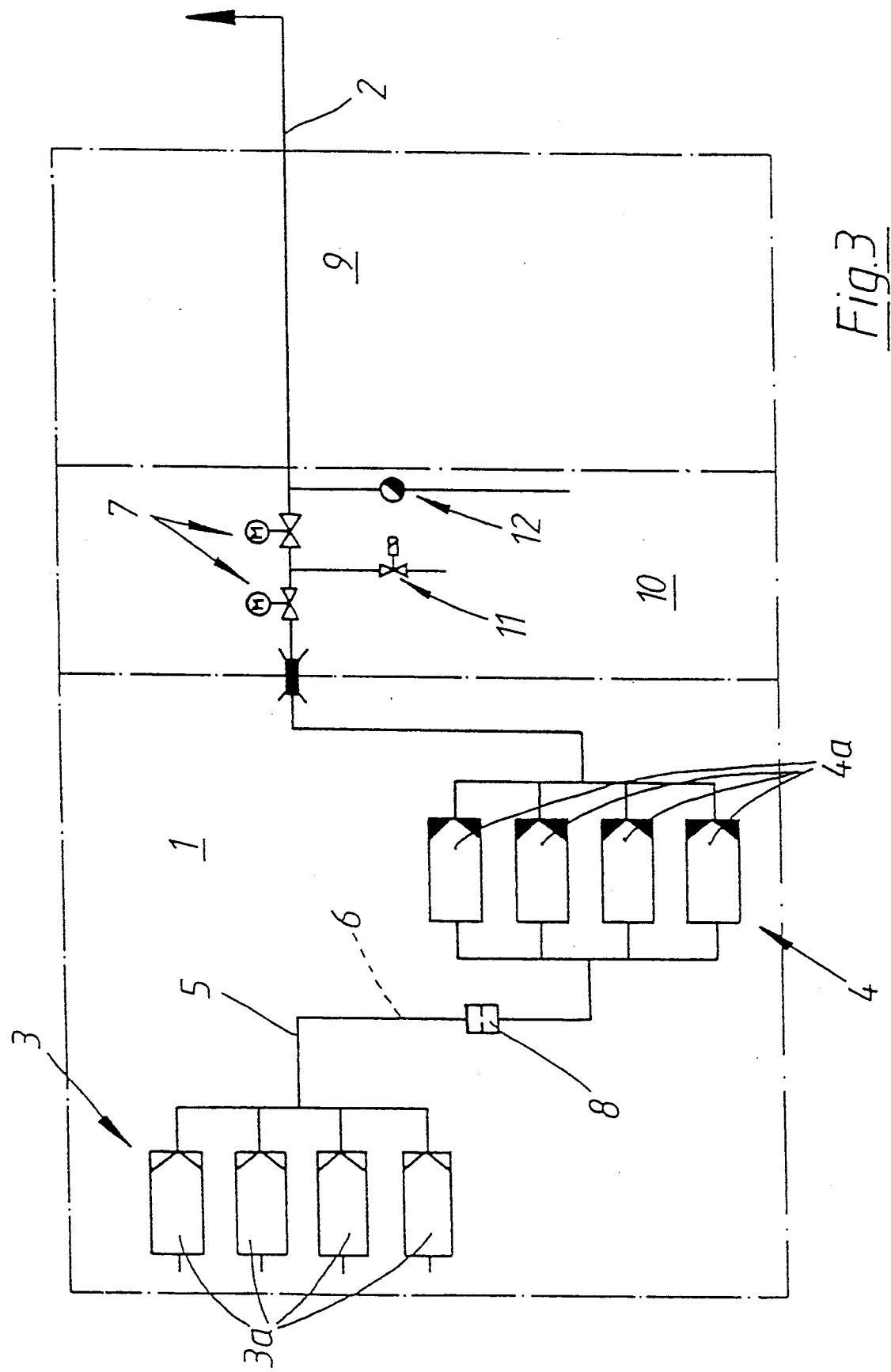
FIG. 3 shows an alternate embodiment related to that of FIG. 2.

In the embodiment in FIGS. 2 and 3, the filter unit 3,4 comprises and aerosol filter subunit 3 and a molecular-sieve subunit 4 for iodine filtration. Each subunit 3, 4 comprises a number of filter elements 3a, 4a. In the embodiment of FIG. 2 the aerosol filter unit 3 is located inside the containment 1. The molecular-sieve subunit 4 is connected outside the containment 1 via duct system 6, reducing valve 8 and actuatable fittings 7 to the duct system 5 for the discharge of the stream of compressed air. In this embodiment, the molecular-sieve subunit 4 is disposed in an existing building 9 for auxiliary equipment. An annular chamber 10 is disposed between building 9 and containment 1 and contains the normal fittings 7 and and also a test connection 11. A drain 12 is provided at the same place. In the embodiment in FIG. 3, the aerosol filter subunit 3 and the molecular-sieve subunit 4 are both arranged inside the containment 1. As before, the molecular-sieve subunit 4 is connected via duct system 6, pressure-reducing valve 8 and actuatable fittings 7 to the duct system 5 for discharging the stream of compressed air. As already mentioned, the filtered stream of compressed air is discharged into the atmosphere at 2.

We claim:

1. In combination with a nuclear power station having a reactor that is surrounded by a containment having a wall and that emits a stream of radioactively contaminated compressed air into the containment when in failure, the reactor further being associated with a structure outside the containment, a device for relieving pressure in the containment during such failure, said device comprising:

a filter unit for filtering radioactively contaminated substances from said stream of compressed air, the filter unit having a plurality of filter subunits outputting a stream of filtered compressed air and including an aerosol-filter subunit wholly located within the containment and a molecular-sieve subunit for iodine filtering wholly located outside the containment in the structure;

means including a plurality of ducts and fittings connected to and interconnecting said filter subunits of said filter unit for conveying said stream of filtered compressed air from the filter subunits and from the containment, at least one of said ducts extending through the wall of said containment, at least one of said fittings being actuatable to open and close in a failure event and at least one of the fittings being a pressure-reducing valve arranged between the aerosol units and the molecular-sieve units; and auxiliary equipment in the structure necessary for operation of the power station.

* * * * *